(12) United States Patent
Matsumoto et al.

(10) Patent No.: US 6,795,446 B2
(45) Date of Patent: *Sep. 21, 2004

(54) COLLECTIVE MONITOR AND CONTROL SYSTEM FOR PLURAL NETWORKS

(75) Inventors: Tsuyoshi Matsumoto, Kawasaki (JP); Hidetoshi Amari, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/193,628

(22) Filed: Nov. 17, 1998

(65) Prior Publication Data

US 2003/0202464 A1 Oct. 30, 2003

(30) Foreign Application Priority Data

Mar. 5, 1998 (JP) .......................... 10-053413

(51) Int. Cl.⁷ ............................. H04L 12/56
(52) U.S. Cl. .................. 370/404; 310/460; 310/222
(58) Field of Search .................. 370/258, 460, 370/401, 402, 403, 404, 405, 406, 452, 466, 474, 217, 222, 223, 224, 230, 235, 236.1, 236.2, 241.1

(56) References Cited

U.S. PATENT DOCUMENTS

| | | | | |
|---|---|---|---|---|
| 3,597,549 A | * | 8/1971 | Farmer et al. ............... | 370/452 |
| 4,539,679 A | * | 9/1985 | Bux et al. ................... | 370/405 |
| 4,596,982 A | * | 6/1986 | Bahr et al. .................. | 370/223 |
| RE32,887 E | * | 3/1989 | Mori et al. .................. | 370/403 |
| 4,829,516 A | * | 5/1989 | Orimo et al. ................ | 370/406 |
| 5,050,166 A | * | 9/1991 | Cantoni et al. ............. | 370/473 |
| 5,179,553 A | * | 1/1993 | Tanaka ........................ | 370/452 |
| 5,220,562 A | * | 6/1993 | Takada et al. ............... | 370/404 |
| 5,315,582 A | * | 5/1994 | Morizono et al. .......... | 370/222 |
| 5,504,747 A | * | 4/1996 | Sweazey ...................... | 370/403 |
| 5,732,211 A | * | 3/1998 | Efron et al. ................. | 370/403 |
| 5,822,298 A | * | 10/1998 | Matsumoto et al. ........ | 370/223 |
| 5,857,092 A | * | 1/1999 | Nakamura et al. .......... | 370/509 |
| 5,859,836 A | * | 1/1999 | Eslambolchi ................ | 370/222 |
| 5,942,989 A | * | 8/1999 | Nagasawa et al. .......... | 370/236 |
| 6,204,943 B1 | * | 3/2001 | Hamel et al. ................ | 359/119 |

FOREIGN PATENT DOCUMENTS

| | | |
|---|---|---|
| JP | 4-237232 | 8/1992 |
| JP | 6-21952 | 1/1994 |
| JP | 9-186708 | 7/1997 |

* cited by examiner

*Primary Examiner*—Dang Ton
*Assistant Examiner*—Phuc Tran
(74) *Attorney, Agent, or Firm*—Katten Muchin Zavis Rosenman

(57) ABSTRACT

A collective monitor and control for plural networks, in which plural networks remotely located in each other can be collectively monitored, is provided. The collective monitor and control system for plural networks includes independent plural networks, each having plural nodes formed into a ring configuration, transmission paths connecting the plural networks and passing only monitor and control data, and a network service processor connected to one node of the plural networks, the one node connected to the network service processor having a switch circuit for broadcasting the monitor and control data received from one route to other routes linked to the one node.

7 Claims, 10 Drawing Sheets

FIG. 6A
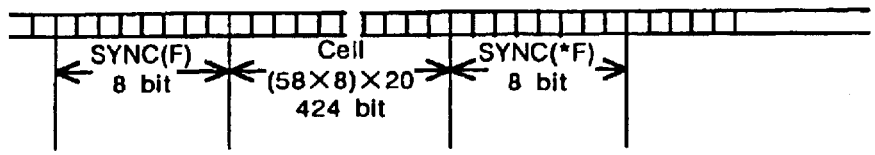
FIG. 6B
| Synchronization pattern | Alternating SYNC(F)/SYNC(*F) pattern<br>SYNC(F)  :00011010<br>SYNC(*F) :11100101 |
|---|---|
| Synchronization protection | by combination of SYNC(F), SYNC (*F) two stages toward backward direction/ two stages toward forward direction are ontineously coincident. |
FIG. 7
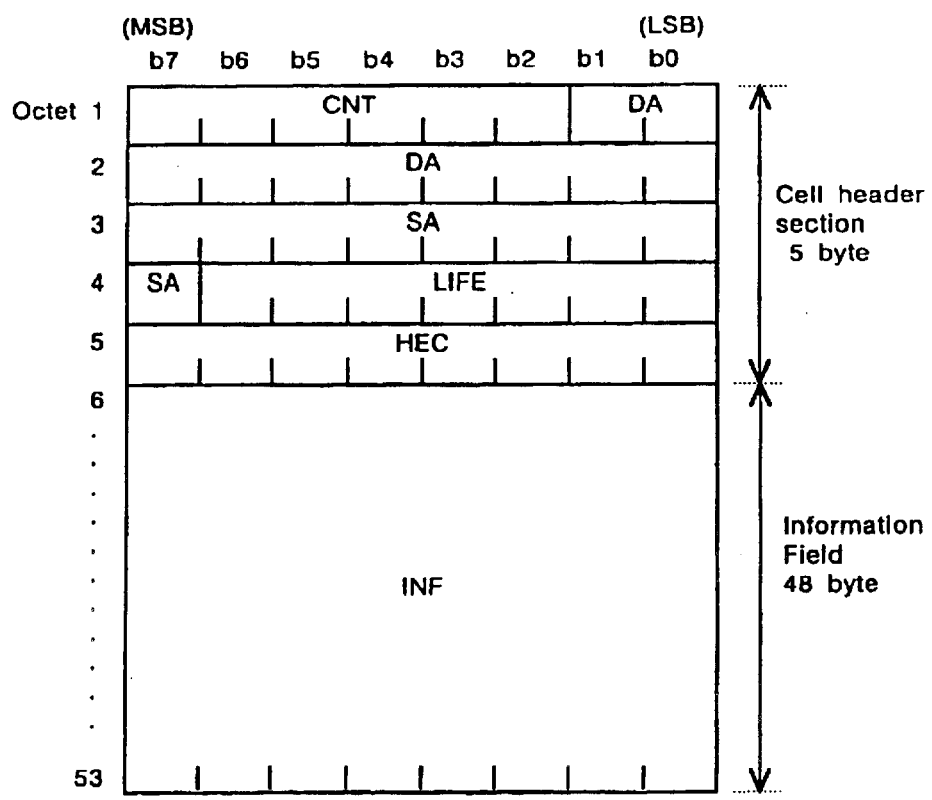

CNT field

DA field

SA field

COLLECTIVE MONITOR AND CONTROL SYSTEM FOR PLURAL NETWORKS

BACKGROUND OF THE INVENTION

1. Field of the Invention

The present invention relates to a collective monitor and control system for plural networks. More particularly, it relates to a system, in which a packet is assembled by employing user bytes in a section over head (SOH) in a synchronous digital hierarchy (SDH) frame, a destination address of the packet is determined at each node, and the packet is received or repeated to collectively monitor and control plural networks, each of which forms a ring configuration.

2. Description of the Prior Art

FIG. 13 is an explanatory diagram of a conventional collective monitor and control system for plural networks. In the conventional system of FIG. 13, a first network having plural nodes NA1 to NAn connected by a transmission path LA forms a ring configuration, and a second network having plural nodes NB1 to NBm connected by a transmission path LB forms a ring configuration, and the first and second networks are independently provided, for example.

In such the network system including the plural, independent networks, a network service processor (NSP) 1 linked to the networks by cables LS1 and LS2 for monitor and control is employed to commonly monitor and control each network.

A structural example of a node, to which the network service processor 1 is connected, is shown in FIG. 14. In FIG. 14, a structural example of a node NA in the conventional system to transmit and receive a packet linked to a transmission path is illustrated in a section enclosed by a broken line. The section enclosed by a broken line is constituted by a packet extracting section 2 where a packet including control and monitor data is extracted from a transmission path LA for transmitting data having a SDH format, and a packet inserting section 8 for inserting a packet to the transmission path LA.

The section further includes a header analysis section 3, which determines whether or not the packet extracted in the packet extracting section 2 is addressed to the own node according to a transmission address of a header section of the packet. If the packet is not addressed to the own node, the packet is transmitted to a packet transmission section 7 where accumulates monitor and control data for transmission through a packet repeating section 13, or is aborted.

On the other hand, when the header analysis section 3 determines that the packet is addressed to the own node, the packet is input to a packet receiving section 4. The packet input to the packet receiving section 4 is further input to a processor section 6 through a packet transmission and reception section 5 that manages to transmit and receive the packet to execute predetermined processes in the own node.

The processor section 6 analyzes the data transmitted from the packet transmission and reception controlling section 5. If the data should be transmitted to the network service processor 1, the data is passed through a monitor and control data interface section 9 and a cable LS1, and is transmitted to the network service processor 1.

On the other hand, the processor section 6 analyzes the data transmitted through the monitor and control data interface section 9 from the network service processor 1. Then, if the data should be transmitted to the packet transmission and reception controlling section 5, the data is transmitted to the packet transmission and reception controlling section 5.

In this way, in FIG. 14, a signal is transmitted and received between a transmission device and the network service processor 1, not by a packet, but the signal is transmitted and received by firmware processing in a processor section 6.

Additionally, the packet transmitting section 7 inserts a packet looped back from the packet repeating section 13 or a monitor and control packet transmitted from the network service processor 1 in the packet inserting section 8 and transmits them to the transmission path LA.

In FIG. 14, when plural networks are monitored by the network service processor 1 linked to a monitor and control data interface section 9 of the node NA, plural ports are provided corresponding to the plural networks in the network service processor 1 to collect the monitor and control data transmitted from nodes in each network, and lump the collected data in one, or the network system in designed to collectively monitor a section of the monitor and control data by employing a modem even if the networks are located on a remote location, each other, for example.

When assuming that the monitor and control data is concentrated from the plural ports corresponding to the plural networks in the network service processor 1, a number of the ports provided on the network service processor 1 may be physically limited.

Additionally, as lengths of the cables LS1 and LS2, through which the monitor and control data is passed, may be also limited, it is difficult to realize to collectively monitor the data when the nodes in the plural networks are located each other in remote locations.

Alternatively, when connecting networks remotely located by employing the modem, a problem such that an exclusive line is required although there is no problem in a point of the distance.

Further, even when employing either of the above-described systems, a problem such that the processing speed would be low because of an intervention, such as a firmware processing in the packet transmission and reception controlling section 5 (refer to FIG. 14) in each network and a software processing in the network service processor 1. Therefore, the problem removes merit obtained by collectively monitoring a plurality of networks in one network service processor 1.

SUMMARY OF THE INVENTION

Accordingly, it is an object of the present invention to provide a system for collectively monitor and control plural networks in hardware, in which communications can be facilitated at a high speed.

It is another object of the present invention to provide a collective monitor and control for plural networks, in which plural networks are remotely located in each other, can be collectively monitored.

It is a further object of the present invention to provide a collective monitor and control system for plural networks, in which a network service processor can be linked to optional nodes of all networks.

To attain the above-described objects, a basic structure of a collective monitor and control system for plural networks consists of independent plural networks, each having plural nodes formed into a ring configuration, transmission path connecting the plural networks and passing only monitor and control data, and a network service processor connected to one node of the plural networks.

In the system, the one node connected to the network service processor has a switch circuit for broadcasting the monitor and control data received from one route to other routes linked to the one node.

In one preferred mode of the present invention, the monitor and control data is taken into a time slot on a specific location of a section over head (SOH) of a synchronous digital hierarchy (SDH) format, which is transmitted through the plural networks.

In other mode of the present invention, the one node has a packet extracting section assembling data transmitted from all routes into a predetermined packet, and the switch circuit includes a buffer circuit, in which packets input from all routes and assembled in the packet extracting section are written and from which the packets are read out, in the order of input.

Additionally, in the present invention, the one node further includes mask circuits on the input side of the switch circuit corresponding to all routes, and the mask circuits regulate and control packets input from optional routes.

Further, other objects of the present invention become clear by the description for explaining embodiments according to the attached drawings.

BRIEF DESCRIPTION OF THE DRAWINGS

FIGS. 6A and 6B are explanatory diagrams of a format and a synchronous pattern of only valid data on a transmission path.

FIG. 7 shows an example of a cell format.

DESCRIPTION OF THE PREFERRED EMBODIMENTS

Figure 1:
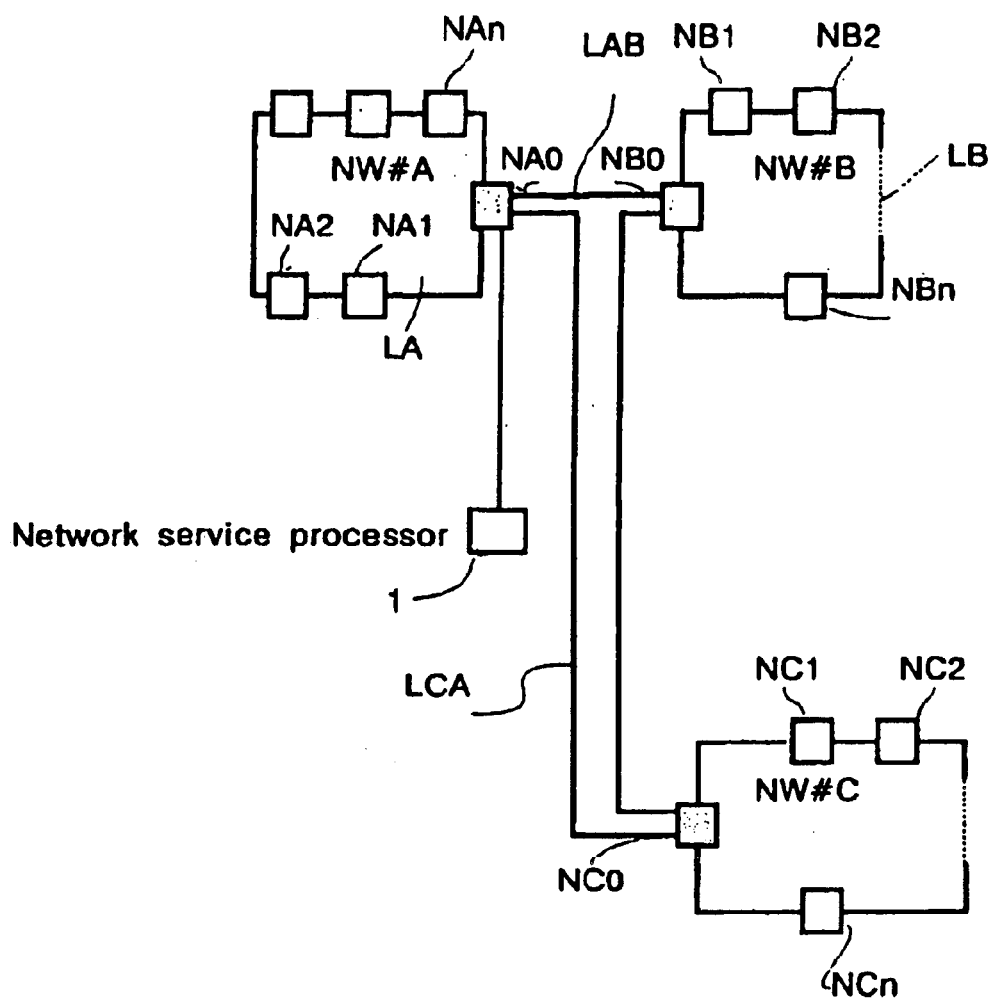
FIG. 1 is a block diagram of an embodiment of a network system employing a collective monitor and control system for plural network according to the present invention.

Throughout the following descriptions, the same reference numerals are used to denote and identify corresponding or identical components.

FIG. 1 shows an embodiment of a network system employing a collective monitor and control system for plural networks according to the present invention.

In FIG. 1, the network system consists of three networks NW#A, NW#B and NW#C, each of which forms a ring configuration, connected by transmission paths into a ring configuration. The network NW#A has plural nodes NA1 to NAn, the network NW#B has plural nodes NB1 to NBn, and the network NW#C has plural nodes NC1 to NCn.

Additionally, it is a feature of the present invention that the transmission paths connect the three networks, namely, transmission paths LAB, LBC and LCA link a node NA0 of the network NW#A to a node NB0 of the network NW#B, the node NB0 of the network NW#B to a node NC0 of the network NW#C, and the node NC0 of the network NW#C to the node NA0 of the network NW#A, respectively.

These network transmission paths LAB, LBC and LCA are formed as to pass only monitor and control data therethrough.

Further, a network service processor 1 can be linked to either of the nodes in the network system according to the present invention, and in FIG. 1, the network service processor 1 is linked to the node NA0 of the network NW#A. It is apparent from FIG. 1 that the network service processor 1 can be linked to the node NB0 of the network NW#B, for example.

Figure 2:
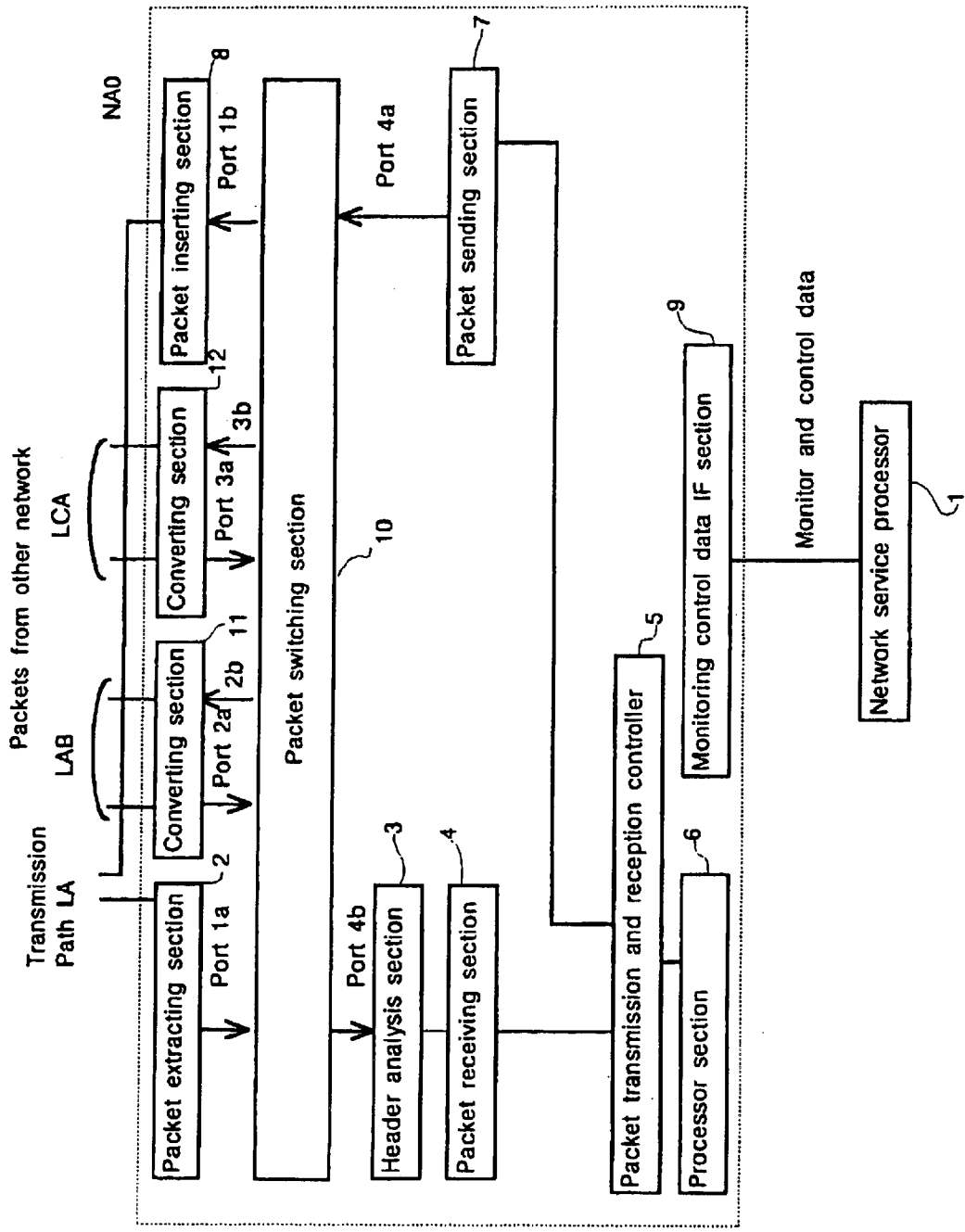
FIG. 2 is a structural block diagram of a node, to which a network service processor 1 is connected, according to the present invention.

FIG. 2 is a structural block diagram of the node to which the network service processor 1 is linked according to the present invention. A structural block diagram of the node NA0 of the network NW#A, which is faced to the node NB0 of the network NW#B and the NC0 of the network NW#C is shown in FIG. 2, for example.

Figure 14:
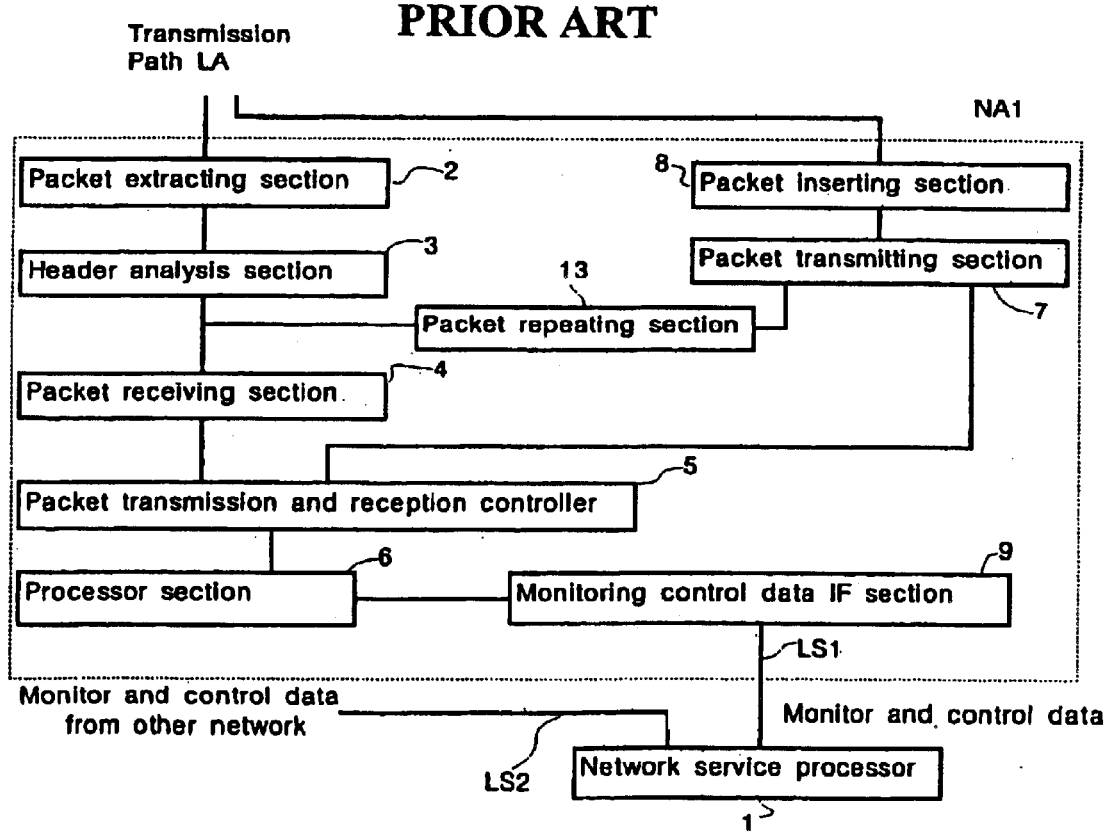
FIG. 14 is a structural block diagram of a node connected to a network service processor 1 in the system of FIG. 13.

Structures of the other nodes may be similar to that shown in FIG. 2 or FIG. 14.

However, it is a different point between the structures of FIGS. 2 and 14 that the structure shown in FIG. 2 includes a packet switching section 10 and first and second converters 11 and 12.

In the structure of the node illustrated in FIG. 2, the packet switching section 10 employs a port connected by a transmission path LA of the network #NA, which is linked to the node NA0, as a port 1, a port connected to an internal circuit of the node NA0 as a port 4, and further, ports of two transmission paths LAB and LCA of the other network NW#B and NW#C as ports 2 and 3.

Further, in the example, input lines to the packet switching section 10 from each of the ports 1 to 4 are denoted as 1a, 2a, 3a and 4a, and output lines from the packet switching section 10 are denoted as 1b, 2b, 3b and 4b.

The above-described first and second converting sections 11 and 12 are respectively linked between the ports 2 and 3 of the packet switching section 10 and the transmission paths LAB and LCA. Therefore, the transmission path can be linked to the ports 2 and 3 of the packet switching section 10 only in the nodes connecting the networks.

In the structure, a packet extracted through the packet extracting section 2 from the transmission path LA, packets received through the converting sections 11 and 12 from the other networks NW#B and NW#C, a packet input from the packet transmitting section 7 of the node are respectively input from the input lines 1a, 2a, 3a and 4a of each port.

The packet switching section 10 multiplexes the packets input from the respective input lines of the ports and outputs the multiplexed packets.

Figure 3A:
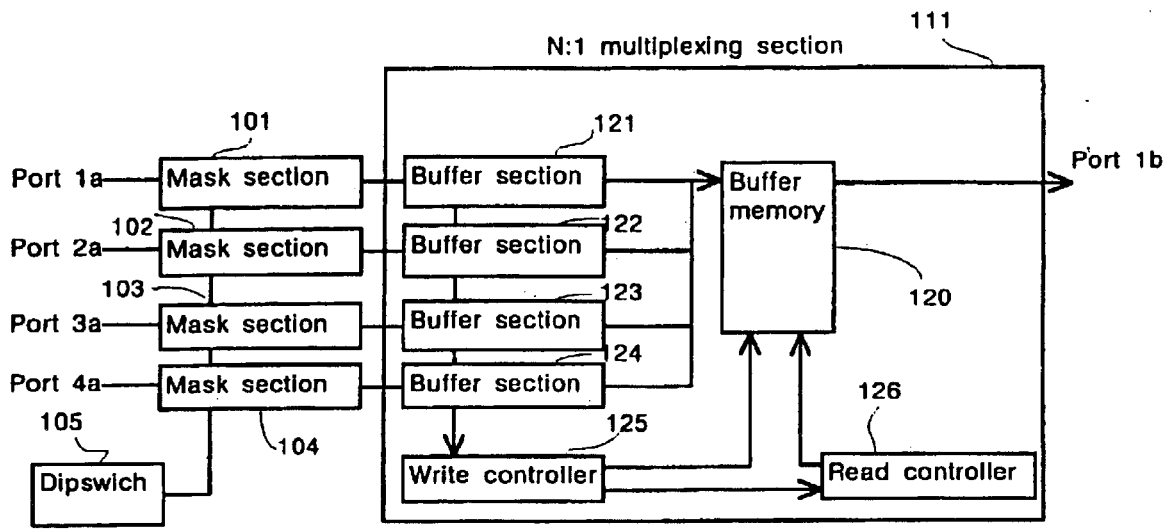
FIGS. 3A and 3B are structural diagrams of a packet switching section 10.
Figure 3B:
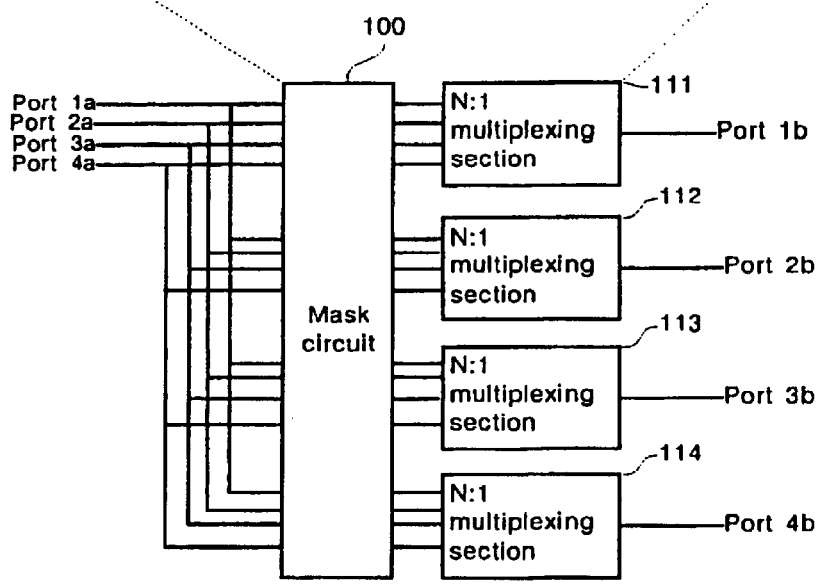

FIGS. 3A and 3B show structural block diagrams of the packet switching section 10. The whole structure of the packet switching section 10 is illustrated in FIG. 3B. The packet switching section 10 includes a mask circuit 100 on the side linked to the output lines 1b to 4b of the ports 1 to 4 and four N:1 multiplexing sections 111 to 114 corresponding to the ports 1 to 4 on the side linking to the output lines 1b to 4b.

Additionally, FIG. 3A shows a detailed structural example of the N:1 multiplexing section 111 and the mask circuit 100 shown in FIG. 3B. Other N:1 multiplexing section 112 to 114 have the same structure.

Functions of the mask circuit will be explained later. At first, the N:1 multiplexing section will be now explained.

The N:1 multiplexing section consists of buffer sections 121 to 124, a buffer memory 120, a write controller 125 and a read controller 126, as shown in FIG. 3A. The outputs from the buffer sections 121 to 124 are commonly input to the buffer memory 120. The buffer memory 120 writes the data at a timing transmitted from the write controller 125 and reads out the data at a timing transmitted from the read controller 126.

Therefore, the N:1 multiplexing sections 111 to 114 can broadcast a packet transmitted from an optional port to other optional port.

Returning back to FIG. 2, a packet is output from the output line 4b of the port 4 of the above-described packet switching section 10 to input to the header analysis section 3. The header analysis section 3 analyzes a header address of the input packet. Then, if the header address and the own node address are coincident, the packet is output to the packet receiving section 4. On the contrary, if not, the packet is aborted.

When completing to receive the packet in the packet receiving section 4, the packet receiving section 4 informs the completion to the packet transmission and reception controlling section 5, and then, the packet transmission and reception controlling section 5 reads out the packet. The packet transmission and reception controller 5 and the processor section 6 analyze the monitor and control data by means of a firmware.

As the result of analysis, if the data is the monitor and control data to be transmitted to the network service processor 1, the packet transmission and reception controlling section 5 transmits the data to the monitor and control data interface (IF) section 9. Data receiving processes are completed here.

On the contrary, data transmitting processes on the node NA0 are as follows:

At first, the monitor and control data interface section 9 receives a request transmitted from the network service processor 1. Then, the packet transmission and reception controlling section 5 analyzes to which node the data is to be transmitted. Then, the result is written to the packet transmitting section 7. The packet transmitting section 7 packetizes the data, writes a destination address on a header of the packet, and transmits the packet to the packet switching section 10.

The packet switching section 10 handles the data input from the packet transmitting section 7, similarly to the data input from the other port, and switches as to optionally output to the packet inserting section 8 or the other networks NW#B and NW#C.

A switching operation at the packet switching section 10 will be now explained. The packet switching section 10 broadcasts packets from all ports to all ports. Therefore, it is required to mask a port needless to be switched, such as a path from the packet transmitting section 7 to the header analysis section 3, in the mask circuit 100.

As is further explained later, the mask circuit 100 also suppresses flowing cells transmitted from the other networks, and reduces the amount of traffics in the network. The mask circuit 100 includes mask sections 101 to 104 corresponding to the buffer sections 121 to 124, as shown in FIG. 3A. The dipswitch 105 controls each mask section 101 through 104 to open or close.

To employ the present invention in the above-described structure, an address of each node in all networks is set to a unique value. Converting sections 11 and 12 are provided between the transmission paths LAB and LCA, each of which is respectively linked to other networks NW#B and NW#C, shown in FIG. 2. The converting sections 11 and 12 take a clock according to a synchronized network, and control a phase of the clock. Additionally, as described later, the converting sections 11 and 12 convert the monitor and control data transmitted from the transmission paths LAB and LCA into the same cell format as that of the cell assembled in the packet extracting section 2, or vice versa.

Only the monitor and control packet is passed through the transmission paths LAB, LBC and LCA in the network system, and therefore, it is possible to employ an optional format of the packet. However, the same format is commonly used in the ports 1 to 4.

Figure 4:
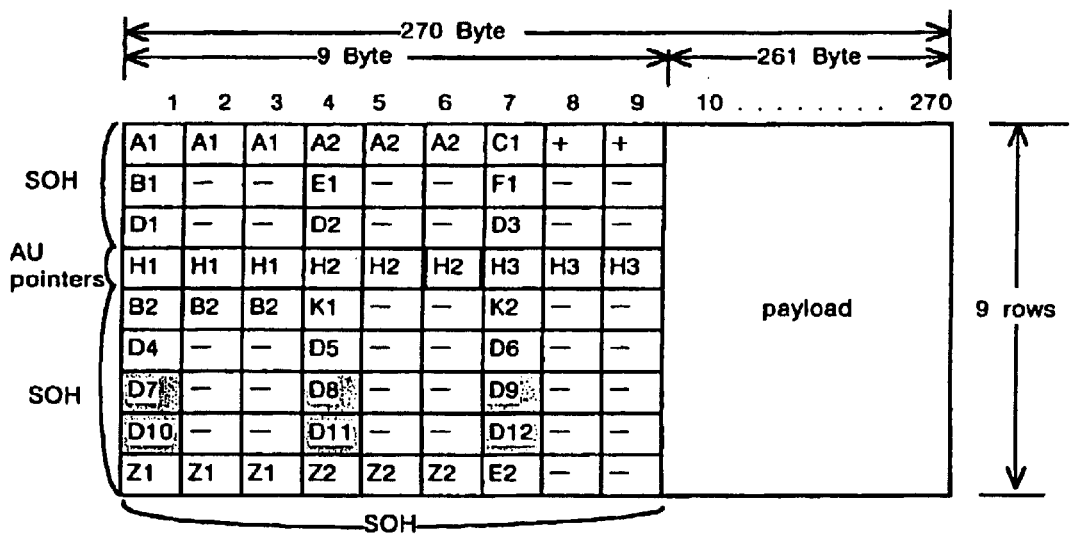
FIG. 4 illustrates locations of paths where communications are facilitated between nodes through transmission paths.

A packet structure in the present invention will be now considered. FIG. 4 shows locations of monitor and control paths where communications are facilitated between nodes in each network through the transmission paths LA, LB and LC in the network system. In this example, six time slot locations of D7 to D12 of an over head SOH in a SDH frame are employed as monitor and control paths. In a transmission path of 150 Mbps, a transmission speed for the communication path can be expressed as 64 kbps×6=384 kbps.

Figure 5:
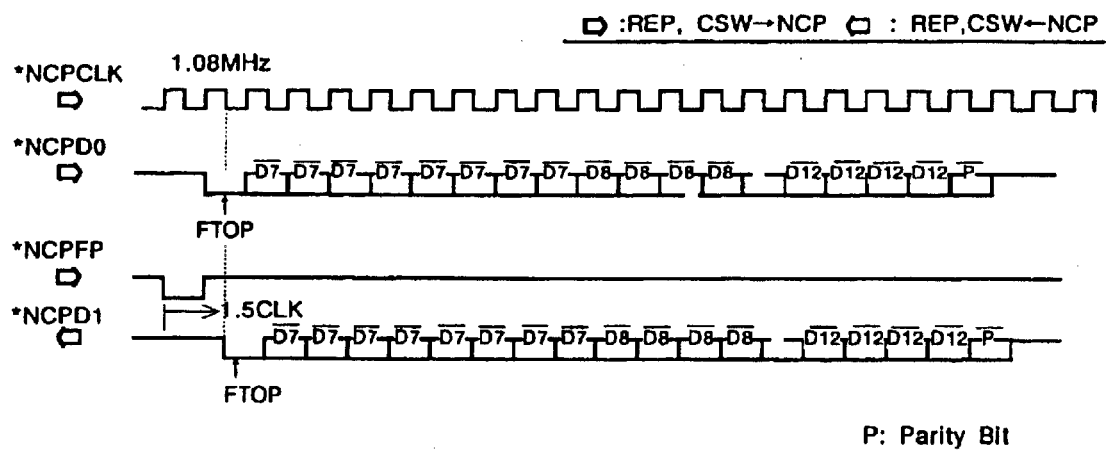
FIG. 5 is an explanatory diagram of a data transmission format of a SDH frame.

Data transmission of the SDH frame is executed by synchronizing it with a clock of 1.08 Mbps, as shown in FIG. 5. The data is transmitted from a downward direction, i.e., data is taken in a node, by detecting FTOP of the data. On the contrary, the data is transmitted to an upward direction, i.e., the data is sent out from the node, by attaching FTOP behind 1.5CLK of *NCPFT according to a frame pulse of 8K, which is transmitted from the upper level device.

Additionally, a format of valid data on a transmission path has an arrangement of twenty cells each having 53 bytes behind a synchronous pattern of 8 bits, as shown in FIG. 6A. The synchronous patterns SYNC(F)=00011011 and SYNC (*F)=11100101 are alternated as shown in FIG. 6B.

Synchronization is protected by two continuous coincidences of a combination of SYNC(F) and SYNC(*F) patterns toward the backward direction and toward the forward direction.

According to the above-described condition, the data of the SDH frame is input to the packet extracting section 2 of the node. The packet extracting section 2 extracts bytes of the time slots D7 to D12 of the over head SOH of the SDH frame, which is described in FIG. 4, and reassembles a cell shown in FIG. 7. In FIG. 7, the reassembled cell is formed with a cell header section of 5 bytes and an information field of 48 bytes.

Figure 8A:
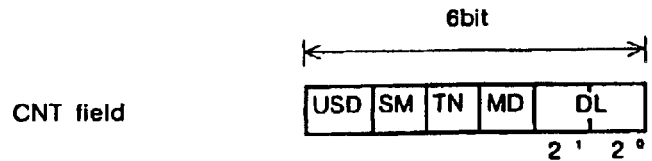
FIGS. 8A, 8B and 8C are explanatory diagrams of fields in the cell shown in FIG. 7.

A meaning of each field of the cell shown in FIG. 7 will be now explained in accompanying with FIG. 8. At first, a CNT field of the first octet shown in FIG. 8A, which is a control information filed of 6 bits, is attached to control the cell.

A USD bit indicates a used or unused flag, a SM bit indicates a flag for permitting to take the transmission cell in a main loop, i.e., a transmission path of 600 Mbps, a TN bit indicates a terminal of eliminating the cell, i.e., indicating whether or not the terminal is to be eliminated is for transmission or reception, a MD bit indicates a flag of switching a communication mode, and a DL bit indicates a cell delimiter, which is a position of each cell when dividing a frame.

Figure 8B:
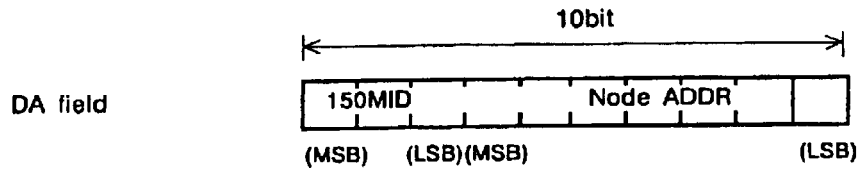
Figure 8C:
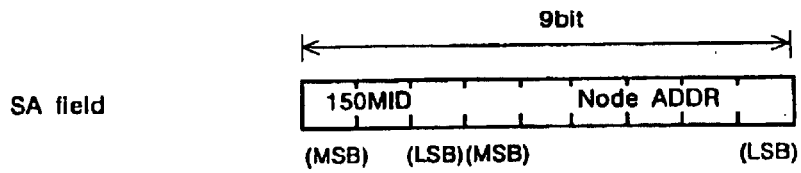

FIG. 8B shows a destination node address field (DA field). The field is an area of 10 bits indicating the destination node to be communicated. Further, FIG. 8C shows a sender node address field (SA filed), which is an area of 9 bits indicating a sender node.

In FIG. 7, a LIFE field is an information field of eliminating the cell, and a HEC filed is for controlling according to an error of the cell header.

The packet extracting section 2 reassembles the above-described cell shown in FIG. 8 according to the received SDH format, transmits the cell through the packet switching section 10 to the header analysis section 3. Therefore, the header analysis section 3 judges whether or not an address indicated by the destination node address (DA) field in the header section of the cell shown in FIG. 7 and the own node address are coincident.

If both addresses are coincident, the analysis section 3 determines that the reassembled cell is transmitted to the own node, and transmits the reassembled cell to the packet receiving section 4. On the contrary, if not, the reassembled cell is aborted.

Figure 9:
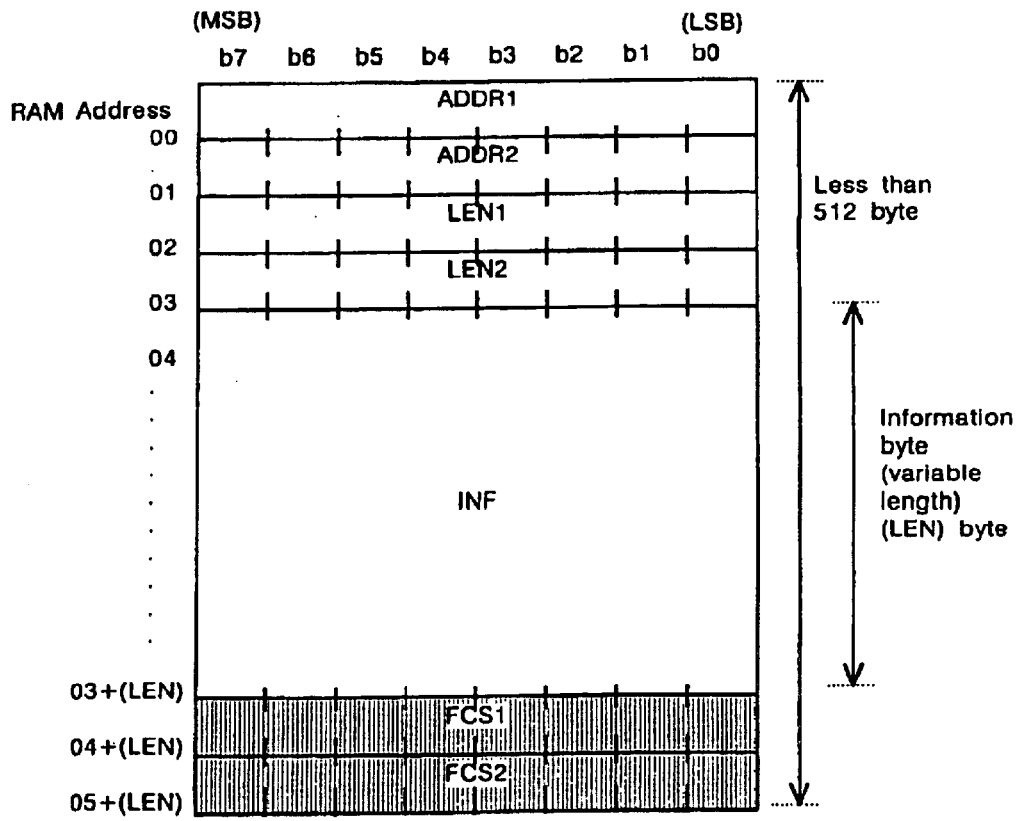
FIG. 9 is an explanatory diagram of a data frame structure of an upper layer in a node.

Additionally, the packet receiving section 5 converts the cell of FIG. 7 input from the packet analysis section 3 into a data frame between PCs of the upper level layer shown in FIG. 9. Then, for the converted data frame processing is executed in the node.

In FIG. 9, ADDR1 and ADDR2 are destination node addresses. The ADDR1 is an address of the destination to be broadcasted. The ADDR2 is a node address of 150 Mbps. LEN1 and LEN2 indicate lengths of the information bytes.

Returning back to FIGS. 3A and 3B, inputs 1a to 4a of the ports 1 to 4 of the packet switching section 10 are respectively passed through the corresponding mask sections 101 to 104. The inputs 1a to 4a are respectively input to the N:1 multiplexing sections 121 to 124.

Packets transmitted from each of the ports respectively input to the N:1 multiplexing sections 111 to 114 are once accumulated in the corresponding buffer sections 121 to 124. When completing to accumulate the packets, the completion of the packet accumulation is informed to a write controller 125. The write controller 125 receives the information transmitted from the buffer sections 121 to 124, and transmits a write timing signal to the buffer memory 120 to write the information in the buffer memory 120 in the informed order, i.e., the order of the cell arrival.

Then, the write controller 125 informs a write starting address to the read controller 126. The read controller 126 accesses the buffer memory 120 in the order of the received addresses, reads the data written to the corresponding addresses, and outputs it to the port 1b.

The N:1 multiplexing sections 111 to 114 are required for a number of the ports. In the present embodiment, four N:1 multiplexing sections are employed to realize the system.

As the packet switching section 10 broadcasts packets in the present invention, it is possible to transmit the packets to nodes in all networks. As described above, unique values are set to node addresses in all networks. Therefore, it is possible to take only a cell addressed to the own node in the header analysis section 3.

Additionally, as explained in accompanying with the conventional system, according to the present invention, there is no need to have plural ports in the network service processor 1 and facilitate communications through a modem, and therefore, only one section of the packet transmission and reception controlling section 5 has an intermediation of a software or a firmware. That makes it possible to transmit data at a high speed.

In here, it is apprehended that packets unlimitedly go around a ring-shaped network system because the packet switching section 10 broadcasts the packets, and the packets are amplified because the packets are copied to plural ports.

However, when employing packets to a ring-shaped network system, a bit sequence, which is varied every time of repeating a node in a header section of the packet, i.e., a LIFE filed as shown in a cell format of FIG. 7, is provided to validate the value at one node receiving the packet and abort the packet when the value is reached to a predetermined value. That can evade the above-described problems.

Figure 10:
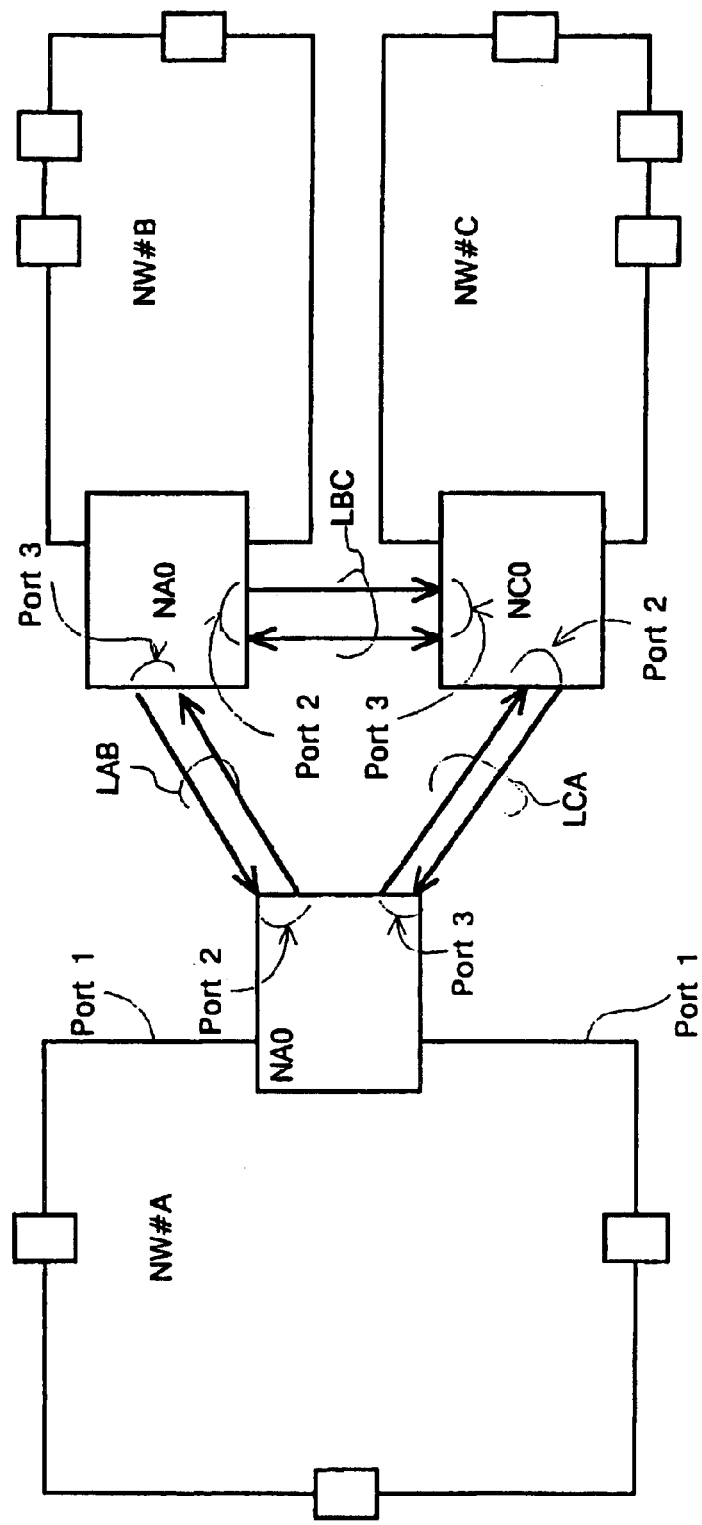
FIG. 10 illustrates an example where three networks constitutes a triangle by nodes A, B, and C.

As plural networks are linked in the network system, a number of the packets become more than the number when operating in one network. As shown in FIG. 10, for example, when nodes A, B and C of three networks NW#A, NW#B and NW#C are linked in a triangular shape, traffics of packets are immediately increased. Therefore, there is a possibility of eliminating packets depending on a capacity of the buffer memory 120 (refer to FIG. 3A).

To prevent this problem, mask sections 101 to 104 shown in FIG. 3 are provided in this network system. In this example, sixteen inputs to four N:1 multiplexing sections 111 to 114 can be independently masked. In the other words, it can be prevented from flowing a packet from an optional input port by selecting the mask sections 101 to 104 at the dip switch section 105 for an output to one port. That makes it possible to reduce the amount of the traffics entirely and prevent from eliminating the packet.

Figure 11:
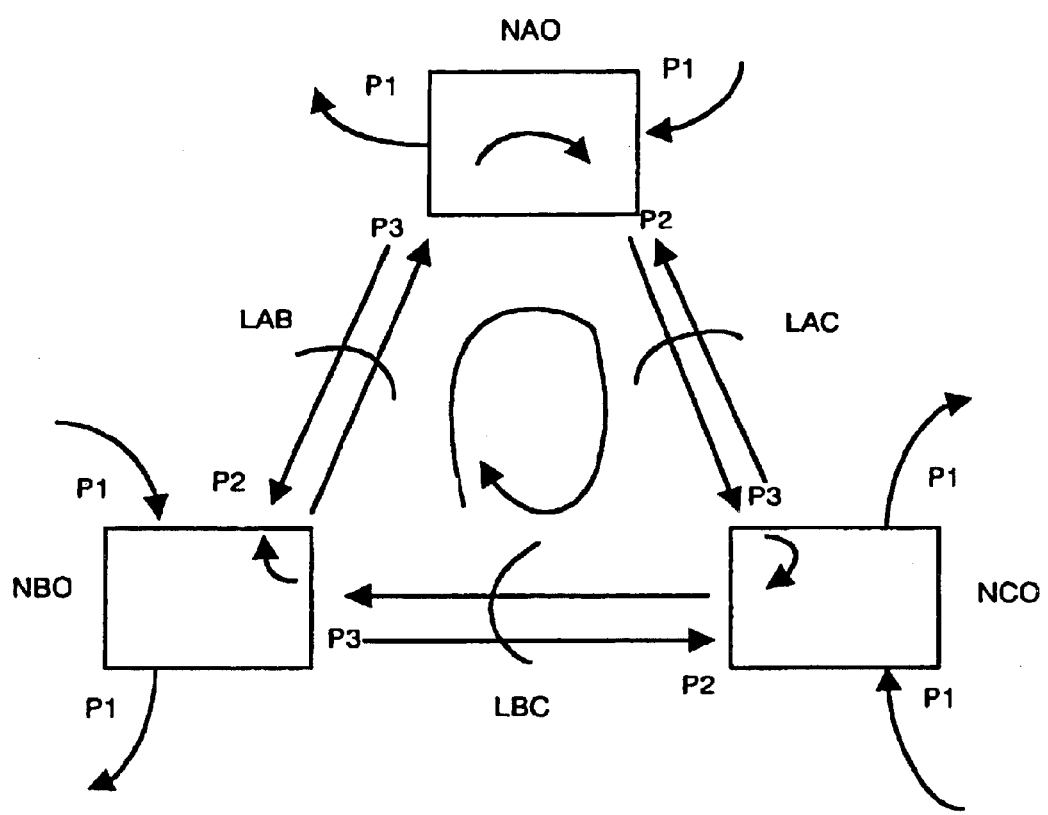
FIG. 11 explains a situation where packet traffics are rapidly increased in the example of FIG. 10.

It will be now explained to prevent such the problem in accompanying with a detailed example. FIG. 11 is a diagram explaining a situation where traffics of packets are immediately increased in FIG. 10. When employing a structure shown in FIG. 11, a loop is formed.

Figure 12:
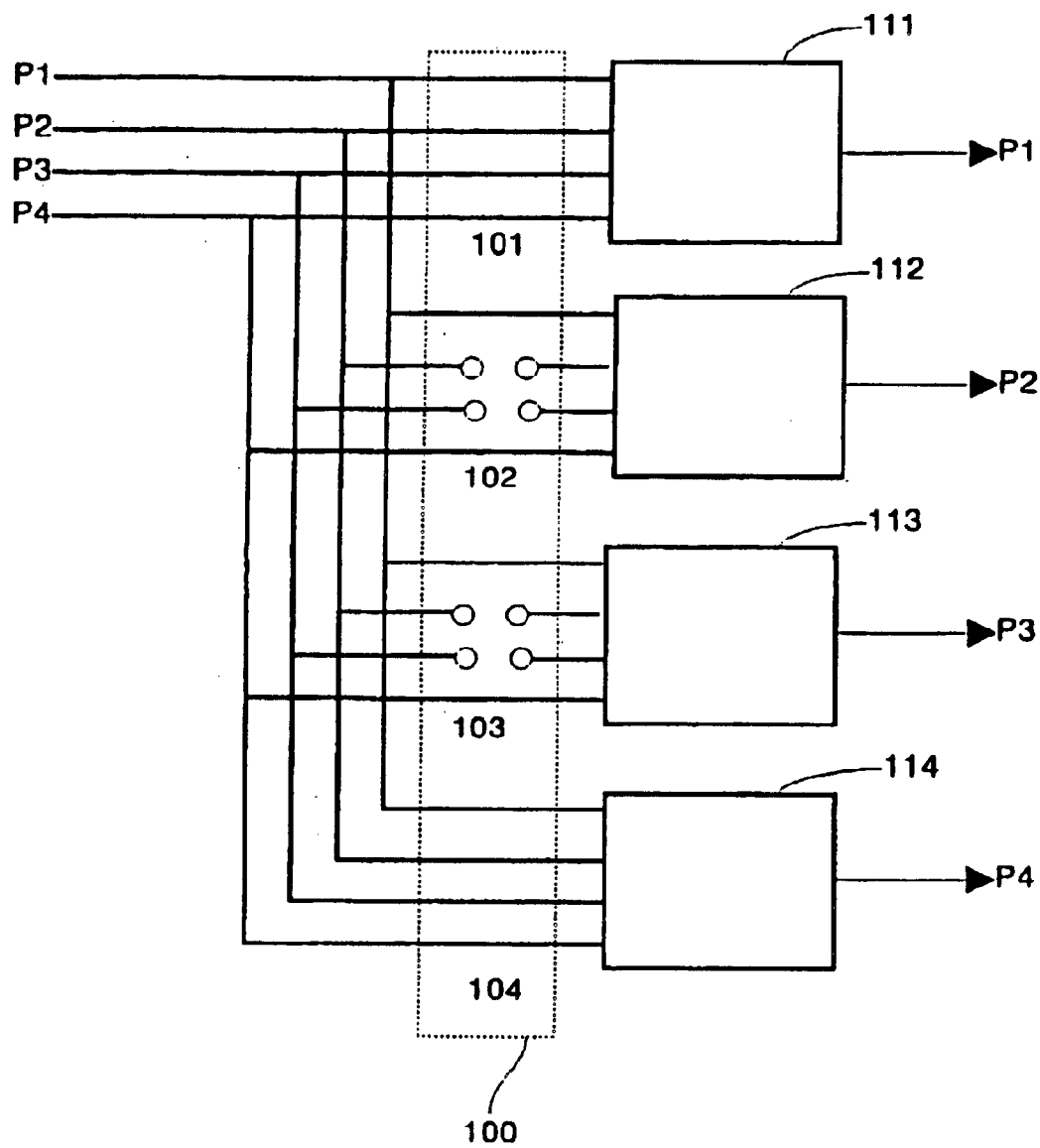
FIG. 12 explains a detailed example of setting a mask circuit shown in FIG. 3B to avoid the situation shown in FIG. 11.
Figure 13:
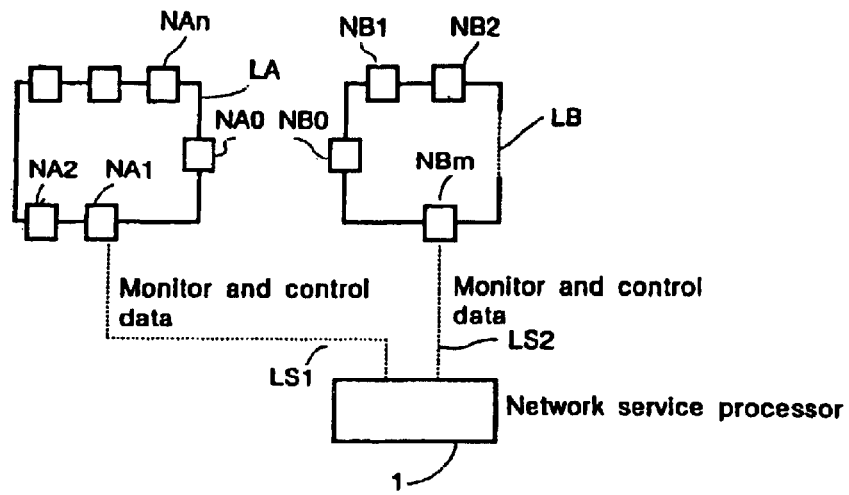
FIG. 13 is an explanatory diagram of the conventional monitor system for plural networks.

To avoid this problem, as shown in FIG. 12, a mask circuit 100 (refer to FIG. 3B) makes mask sections 102 and 103 OFF. Then, the packet is not passed between ports P2 and P3, thus decreasing the amplifications of the number of the packets.

As is explained above, according to the present invention, although plural networks have been collectively monitored by having plural ports on a network service processor and facilitating communications through a modem, it becomes possible to collectively monitor plural networks on hardware by adding a port switching section.

That makes it possible to facilitate communications at a high speed. Additionally, the present invention is applicable to even such a structure that networks are remotely located in physically long distance and are difficult to be collectively monitored, for example, networks located respectively in Tokyo and Kansai areas have not been possible to be collectively monitored from either one area. However, it may be possible to collectively monitor the networks remotely located in physically long distance, as providing in a closest network a node having the structure employing the present invention.

In other words, it is possible to connect a network service processor to optional nodes of all networks. Additionally, it becomes possible to reduce traffics by adding mask sections even if traffics generated according to the present invention on the network are increased.

The invention may be embodied in other specific forms without departing from the sprit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A collective monitor and control system for plural networks, comprising:

independent plural networks, each having plural nodes formed into a closed ring configuration;

a network service processor connected to only one node of only one of the plural networks; and a transmission path connecting between the one node connected to the network service processor and each node of remaining plural networks and passing only monitor and control data therebetween, the one node connected to the network service processor having a switch circuit for broadcasting the monitor and control data received from one route to other routes directed to the each node of remaining independent plural networks, wherein the monitor and control data is taken into a time slot on a specific location of a section over head (SOH) of synchronous digital hierarchy (SDH) format, which is transmitted through the transmission path.

2. The system according to claim 1, wherein the one node has a packet extracting section assembling data transmitted from all routes into a predetermined packet, and the switch circuit includes a buffer circuit, in which packets input from all routes and assembled in the packet extracting section are written and from which the packets are read out in the order of input.

3. The system according to claim 1, wherein the one node further includes mask circuits on the input side of the buffer circuit corresponding to all routes, and the mask circuits regulate and control packets input from optional routes.

4. A collective monitor and control system for plural networks, comprising:

independent plural networks, each having plural nodes formed into a ring configuration by a first transmission path transmitting monitor and control data, which is inserted in a time slot of a specified location of a section over head (SOH) having a synchronous digital hierarchy (SDH) format;

a second transmission path connecting the independent plural networks, and transmitting only monitor and control data with a format different from the synchronous digital hierarchy (SDH) format; and a network service processor, connected to one node, which is connected to the second transmission path, of the independent plural networks.

wherein the one node includes a packet extracting section, which extracts the monitor and control data of the time slot of the specific location of the section over tread (SOH) having the synchronous digital hierarchy (SDH)) format, and reassembles a packet, a header analysis section judging whether or not the packet is addressed to the own node according to a destination address in the over head of the packet reassembled in the packet extracting section, an interface section for transmitting the monitor and control data to the network service processor when the packet is addressed to the own node, and a packet switching section broadcasting the packet reassembled to the packet control data and the network, to which the node is belonging.

5. The system according to claim 4, wherein the one node further includes a converting section assembling the monitor and control data input from the second transmission path for transmitting only the monitor and control data into a packet having the same format of the packet reassembled in the packet extracting section, and wherein the packet switching section includes a buffer circuit, to which the packet reassembled in the packet extracting section and the packet assembled in the converting section are written and read out in an order of input and commonly transmits outputs from the buffer circuit to the plural networks via the second transmission path for transmitting only the monitor and control data.

6. The system according to claim 5, wherein the packet switching section further includes buffer sections provided correspondingly to ports, which are required for the first and second paths and a connection to the network service processor.

7. The system according to claim 6, wherein the packet switching section includes mask circuits, which are provided respectively between each of the ports and each of the buffer sections and, which regulate packets input from an optional transmission path.

* * * * *